United States Patent Office 3,600,433
Patented Aug. 17, 1971

3,600,433
PERFLUORO CYCLOHEXANE ESTERS OF ACRYLIC AND METHACRYLIC ACIDS
Dewey G. Holland, Allentown, Ronald C. Moyer, Souderton, John H. Polevy, Allentown, and Robert A. Walde, Emmaus, Pa., assignors to Air Products and Chemicals, Inc., Philadelphia, Pa.
No Drawing. Filed Jan. 11, 1967, Ser. No. 608,510
Int. Cl. C07c 69/54
U.S. Cl. 260—486R      6 Claims

ABSTRACT OF THE DISCLOSURE $C_2$ and higher alkyl benzoyl halides are subjected to electrolytic fluorination in a fluorination cell under conditions producing corresponding perfluorinated (alkyl cyclohexane) carbonyl fluorides in high yield and with minimum destruction of the carbonyl function. Periodic reversal of polarity, circulation of HF electrolyte, and prolonged uniform production rate subsequent to an induction period of several days are described as contributing factors. Perfluoro and polyfluoro cyclohexane carbonyl fluorides, particularly those containing a 4 perfluoroalkyl substituent, are converted to amides or esters having polymerizable unsaturation. Segmented copolymers such as polybutadiene-poly (perfluoro-4-n butyl cyclohexane) carbinol acrylate impart soil repellancy and related perfluoro surface properties to substrates such as textiles. Fabrics treated with such copolymers and thermally cured, and containing as little as 0.5% fluorine, have acceptable oil and water repellency.

---

The present invention is directed to perfluorocyclohexane compounds obtained by electrolysis of organic acids or their acidogenic derivatives, polymerizable derivatives of such fluorinated compounds; and to the ultimate end uses of such compounds and their derivatives.

Numerous investigators have reported the electrolytic fluorination of a broad range of organic compounds with hydrogen fluoride. In this electrolytic process, organic compounds almost universally react with hydrogen fluoride, permitting preparation of many varieties of fluorinated products. However, the process as heretofore practiced has been unselective, producing poor to, at best, very modest yields of functional perfluoro-organic compounds and being generally accompanied by the production of predominating amounts of non-functional degradation products, such as fluoro-carbons. Even with such favored charge stock as organic acid halides, notoriously small yields of perfluoroacid fluorides have been obtained. The retention of the original carbonyl functionality has been a particular problem with aromatic acids such as benzoic acid. For example, the electrolytic fluorination of benzoic acid has been disclosed in Simons Pat. 2,519,983, but no significant yield data are set forth. In general, product yields in the fluorination of aromatic acids have been in the range of, at best, 10 to 15 weight percent of the desired perfluoro-functional compounds, with a predominant part of the charge converted to non-functional fluorocarbons.

An important object of the invention is the synthesis of certain polyfluoro and perfluoro-alkyl substituted cyclohexane carboxylic acids, anhydrides, esters, acid halides, amides and their derivatives as new compositions of matter having new and unusual physical and chemical properties alone and as monomers and as derived polymers.

It has now been found that perfluorinated alkyl cyclohexane carboxylic compounds wherein the alkyl group contains 2 or more carbon atoms, have unique properties in imparting perfluoro-surface characteristics to a substrate. Moreover, such fluorinated alkyl cyclohexane carboxylic compounds can be converted to polymerizable esters or other polymerizable derivatives retaining the carbonylic function, which polymers are effective as treating and modifying agents for textile fabrics and other surfaces imparting to the treated fabric or surface exceptionally high oil and water repellency.

The obtained perfluorinated cyclohexane carbonyl fluorides react readily to form a wide series of novel derivatives among the more important of which are polymerizable esters and amides containing an unsaturated or olefinic moiety.

By extensive study of the conditions for electrolytic fluorination of certain carboxylic acid compounds and their acidogenic derivatives in liquid hydrogen fluoride, the present applicants have discovered that during an initial induction period very little reaction product is precipitated for the quantity of electrical energy supplied. As the input of electrical energy and supply of acidic charge stock is continued beyond an initial induction period, the rate of production of desired poly and perfluoro compounds retaining the carbonyl function is considerably increased and tends to continue at a substantially constant high rate for prolonged periods. This achievement of a continuing high rate of product output following a low-yield induction period has not previously been observed or appreciated. It is employed in the practice of the present invention to obtain high production rates of fluorinated product in the fluorination of benzoyl halide containing an ethyl or higher alkyl group attached to the benzene ring which fluorinated products are rich in the corresponding perfluorinated alkyl cyclohexane carbonyl fluorides. The extended post-induction period can be prolonged and desired product yields maintained or improved by selected operating conditions under controlled temperature and voltage, including the features of circulation of the electrolyte and periodic reversal of electrode polarity.

In contrast with earlier electrolytic fluorination of aromatic acids or acid halides, which yielded only 10 to 15 weight percent of functional fluorinated product, attractive yields of fluorinated materials are obtained, of which about 60 to about 90 percent or more consists of the desired functional poly and perfluoro acid fluorides.

In the following formulae, in each instance, $\phi$ stands for a perfluorinated alkyl cyclohexane group having an alkyl chain of from 2 to 10 carbon atoms. Similarly, A designates an alkyl group of 1 to 4 carbon atoms.

New compounds produced in accordance with the invention include those corresponding to the type formulae:

a) 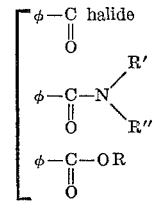

R'=H, or A
R"=H, or A
R=H or A (b)     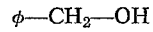

as well as esters formed by reaction of the acid or acyl halide of the (a) type above with a hydroxy ethyl acrylate or hydroxy ethyl methacrylate; the amides formed by reaction of such (a) type acids or acyl halides with amino ethyl acrylate, amino ethyl methacrylate, N-methylamino ethyl acrylate or N-methylamino ethyl methacrylate which correspond in type to the formulae:

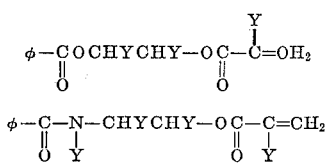

where Y=H or methyl and esters formed by reaction of carbinols of type (b) above with acrylyl chloride or methacrylyl chloride, which compounds correspond to the formula

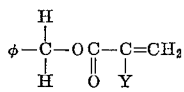

where Y is H or methyl.

All of the above compounds of the (a) type can be symbolized by the generic formula

wherein Z is halogen, hydroxyl, amino, alkylamino, or acrylate or methacrylate derivatives of hydroxyalkylamino, or hydroxy alkyl oxy.

While the preferred compounds of the invention are those derived from intermediates comprising a perfluorinated $C_2$ or higher alkyl group attached to perfluorinated cyclohexane carbonyl compound or attached to a perfluorinated cyclohexane carbinol compound, other novel compounds useful in practice of the broad principles of the invention are similarly obtained from starting intermediates in which the perfluorinated cyclohexane group has no fluoroalkyl substituent or the fluoro alkyl substituent is perfluoro methyl ($CF_3$). The corresponding derivatives formed from such starting intermediates include:

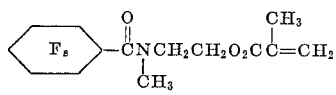

B.P. 100–110° C./0.3–0.4 mm.

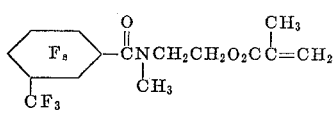

B.P. 102–107° C./0.27 mm.

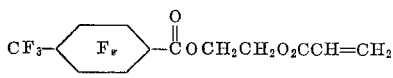

B.P. 70–85° C./0.5 mm.

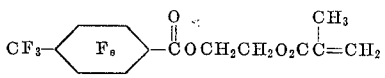

B.P. 85–90° C./0.7 mm.

Because the functional polyfluoro and perfluoro products of the present invention feature the combination of a relatively large fluorinated group attached to a single carbonyl group, they are particularly suited for imparting perfluoro surface characteristics to a substrate. In achieving such surface modification, the functional group may be bonded chemically or by intermolecular forces to the substrate. Derivatives such as amides, alkanol-amides, polyethers, etc. are used to enhance the intermolecular affinity of the carbonyl group for the substrate. Derivatives such as allylic esters, acrylate esters, and methacrylate esters can be employed to modify the surface of unvulcanized rubber or other substrate reactive with unsaturated monomers. Homopolymers and copolymers can be prepared from the derivatives which are polymerizable monomers. In the textile treating technology, segmented polymers comprising an unsaturated ester having a perfluoro group and a cheaper polymeric extender have been proposed for imparting perfluoro surface characteristics to fabrics. The polyfluoro and perfluoro acid fluorides of the present invention are useful in the preparation of such segmented polymeric materials suitable for textile treating compositions. Aqueous emulsions of segmented copolymers can be conveniently employed for imparting perfluoro surface characteristics to a substrate such as a textile fabric. Although applied to the fabric from an aqueous emulsion, the organic treatment bonds itself (after a suitable curing step) to the textile so firmly as to resist removal in subsequent laundering and/or dry cleaning operations. Certain other substrates benefit from the surface characteristics of the polyfluoro or perfluoro group after the fluoro acid fluoride has been transformed to a derivative more useful in the surface treatment step.

Alkyl benzoyl chlorides were fluorinated in a 4500 cc. capacity electrolytic cell essentially of the type described in U.S. Pat. 2,519,983. The outer body and lid of the cell were constructed of Monel metal. The electrode pack was a series of alternately spaced nickel anode and cathode plates. The plate spacing was approximately ⅛ inch and the annulus between the electrode pack and the inner wall of the cylindrical cell was approximately 1 inch. The cell plates were 1/16 inch thick and were insulated from each other with polytetrafluoroethylene spacers. A condenser, through which the exit gases were passed, was cooled with a liquid $CO_2$ fed cold finger and maintained at about −30 to −40° C. The outer refrigerator jacket of the cell body was generally maintained between 20 to 60° F., by circulating a cooling liquid therethrough.

In cell operation in general, the 4500 cc. volume cell, with a total anode area of 4.245 square feet, was loaded to capacity with liquid HF. Five volts of direct current were applied and increased over a period of time until the current drawn was below 5 amperes at an applied 7 volts indicating that the hydrogen fluoride was dry. To this dry electrolyte there was added about 10 percent by weight, of the aromatic acid chloride charge. The electrolyte temperature was generally maintained between 35 to 65° F. throughout the process by operation of the jacket coolant system. The voltage applied was in the range of about 7 to 9 volts, providing a current density between 5 to 10 amperes per square foot of anode area. No product precipitated in the cell until a critical concentration had been reached which exceeded the solubility of the product in the electrolyte mixture. With the continuous passage of current and the progressive addition of organic charge stock, the production of fluoro-organic product became noticeable as a precipitate. After a certain amount of initial precipitate was formed, further production of fluorinated product was at an increasing rate until a substantially steady high rate was attained.

Every 24 hours product was drained from the bottom of the cell and aromatic acid chloride was added through a stoppered opening in the top of the cell. Each fresh charge was added to the cell based on the consumption of electrical power. Approximately 2 moles excess of fresh charge were maintained over and above the number of Faradays passed through the cell, divided by the number of Faradays required in the theoretical equation for the process.

Circulation of the electrolyte was effected in certain of the runs to maintain the desired current density. The electrolyte was pumped from the bottom of the cell, taken through an external line and reintroduced to the top of the cell at a flow rate of approximately 1 liter/minute, for a period of time (generally 15–30 minutes) sufficient to maintain the amperage at the desired level. The reverse order of pumping has been used and shown to afford the same effect. As the run proceeded in some instances, it became desirable to employ the circulation procedure at least once or twice daily. Reversal of electrode polarity which was also effective in increasing amperage, was carried out at least once every 24 hours.

The charge stock in each of the specific examples below was an alkyl aromatic acid chloride. It is recognized, however, that free acid, acid anhydride, ester, other acid halide or amide can be used effectively as charge stock since these acidogenic derivatives are converted to the acid fluoride in the presence of the large excess of anhydrous liquid hydrogen fluoride under cell operating conditions. Accordingly, free aromatic acids or their acidogenic derivatives are suitable charge stocks, with the acid halide preferred over the ester, acid or anhydride since the use of these as charge stocks will consume HF and release alcohol or water in conversion of the charge to acid fluoride. The aromatic acid fluoride is the most suitable charge stock when available.

760 mm. The designation of $C_6F_{10}$ in the formula refers to a bisubstituted (usually 1,4-but comprising any isomeric 1,2 and/or 1,4) perfluoro cyclohexane group. Similarly, other esters were obtained from homologous perfluoroacid fluorides, which esters were carefully purified by gas-liquid chromatography. Data concerning the thus purified esters are tabulated as follows:

| | Refractive index | Ultimate analysis, percent | | | |
|---|---|---|---|---|---|
| | | Carbon | | Hydrogen | |
| | | Theory | Found | Theory | Found |
| Ethyl-perfluoro(-4-ethyl-cyclohexane) carboxylate. | $\frac{N\ 25.5}{D}=1.3306$ | 29.1 | 29.1 | 1.11 | 1.05 |
| Ethyl-perfluoro(4-n.butyl-cyclohexane) carboxylate. | $\frac{N\ 26.5}{D}=1.3307$ | 28.2 | 28.1 | 0.91 | 0.93 |
| Ethyl-perfluoro(-4-isopropyl-cyclohexane) carboxylate. | $\frac{N\ 22.0}{D}=1.3319$ | 28.59 | 28.28 | 1.00 | 1.04 |
| Ethyl-perfluoro(-4-methyl-cyclohexane) carboxylate. | $\frac{N\ 24.0}{D}=1.3315$ | 29.72 | 29.73 | 1.25 | 1.24 |

EXAMPLE I

The 4500 cc. cell was charged with anhydrous HF and dried in the previously described manner. Then 4-ethyl benzoyl chloride (2.68 moles) was introduced into the top of the cell and a direct current of 7.6 volts, was applied. Charge was added and product was collected on a 24-hour basis.

No fluoro-compound was actually separated prior to the passage of 81 Faradays. At the passage of approximately 100 Faradays, less than 1.6 g. of product per Faraday was precipitated. In the subsequent post-induction period 2525 grams of fluoro-product were precipitated with the consumption of 271 Faradays, or at an average rate of over 9 grams/Faraday, almost 6 times the preinduction rate.

The composition of the cell product was determined by an esterification technique. A sample of cell product (10.0 g.) was added dropwise to 5.0 g. of absolute ethanol while stirring the reactants at room temperature. After the addition was complete, the solution was heated at 70° C. for one hour and was then decanted into 50 ml. of water. After vigorous agitation, a lower phase was separated. A vapor-phase chromatogram of a 5 microliter sample of the esterified product was compared with a chromatogram of the nonesterified cell product. The materials whose retention times were lengthened by the esterification technique were considered to be ethyl esters of those fluorochemicals which retained the carbonyl function through the electrolytic fluorination process. The materials whose retention times remained the same in both the nonesterified and esterified sample were considered to be fluorocarbons which did not possess any carbonyl functionality. The total fluorination product was thus found to consist of 71.7 percent of fluoroacid fluoride. The principal component, perfluoro-(4-ethyl cyclohexane) carbonyl fluoride, was found to be at least 46.2 percent of the total product. Several other acid fluorides, some probably not totally fluorinated, were found to be present on the order of, at most, 25.5 percent of the total product.

Perfluoro-(4-ethyl cyclohexane) carbonyl fluoride is considered to be a new composition of matter. The total fluoro-product constituting a technical grade of $C_2F_5C_6F_{10}COF$, had a boiling point of 121–131° C. at 760 mm.

EXAMPLE II

The 4500 cc. cell was charged with anhydrous HF and dried in the previously described manner. Then 4-isopropyl benzoyl chloride (2.46 moles) was introduced into the top of the cell and 8.0 volts direct current were applied.

In the induction period up to the passage of 76 Faradays, only about 110 grams of precipitated product were formed, corresponding to less than 1.5 grams of fluorinated product per Faraday. In the subsequent post-induction period, with the further passage of 141 Faradays, 1565 g. of additional fluoro-product were recovered, at an average rate of about 11 grams per Faraday.

The composition of the product collected was determined by the esterification technique described in Example I. The fluorinated product was found to have a fluoroacid fluoride content of 69.1 percent. The major component, perfluoro (4-isopropyl cyclohexane) carbonyl fluoride, was found to be at least 26.4 percent of the total product. Several other acid fluorides were found to be present on the order of, at most, 42.7 percent of the total product. Some epidence indicated that a portion of the 4-isopropyl benzoyl chloride charge might have been isomerized, cleaved, or rearranged by liquid HF under electrolysis conditions to give functionally active normal and isopropyl perfluoro derivatives, and/or that other similar isomerization reactions might have occurred. Various isomers are deemed to be substantially equivalent for waterproofing fabrics, and would not be separated for such use. Although isomers of fluorinated compounds can be differentiated analytically, the contemplated end use of soilproofing discouraged purification or analysis of the technical grades of the useful compounds.

EXAMPLE III

The 4500 cc. cell was charged with anhydrous HF and dried in the previously deescribed manner. Then 4-n butylbenzoyl chloride (3.29 moles) was introduced into the top of the cell and 7.6 volts direct current were applied.

Over the total period of the run 152 Faradays were passed and 1158 grams of fluorinated product were obtained; the passage of the first 38 Faradays during the low yield induction period resulting in the production of 10 grams of fluoro-product. The post induction rate of 10.2 g. per Faraday is thus about 39 times the pre-induction rate.

The composition of the product collected was determined by the esterification technique described in Example I. The total fluorination product was found to have an 81.6 percent perfluoro-acid fluoride content. The principal component, perfluoro-(4-n-butyl cyclohexane) carbonyl fluoride, was found to be at least 30.6 percent of the total product. Several other acid fluorides were found to be present on the order of at most 51.0 percent of the total product. The new compound

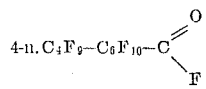

boils at 64–69° C./0.5 to 0.7 mm. Hg pressure.

The operation of the electrolytic cell was superior to previous experience partly because of circulation of the cell electrolyte and partly because of frequent reversal of electrode polarity. Surprisingly long on-stream runs were obtained with high electrical and chemical efficiency and long cell life. Periodic (or continuous) circulation of the cell electrolyte through an external coil was practiced to effect both temperature control and better electrolyte conductivity, resulting in increased amperage and a higher rate of reaction. Electrolyte was pumped from the bottom of the cell during on-stream operation, taken through the external heat exchanger and recharged to the top of the cell at a flow rate of about one liter per minute for a period generally of 15 to 30 minutes to effect increase in amperage to the desired level. The reverse order of pumping was used to the same effect. As the run proceeded, more frequent circulation periods were employed and, alternatively, controlled continuous circulation of the electrolyte was also effective.

Reversal of electrode polarity, which was first practiced about once a day to clean the electrode when amperage decay was observed, was accelerated to periods as short as a reversal every five minutes. Under these conditions the electrodes remained clean and no current density decay was noted during a run of more than 900 Faradays as described in the following example.

EXAMPLE IV

The 4500 cc. cell was charged with anhydrous HF and dried in the previously described manner. Then 4-n butylbenzoyl chloride (3.29 moles) was introduced into the top of the cell and 7.6 volts of direct current were applied. Product was collected and charged was added as follows:

| Cumulative charge added to cell moles | Cumulative Faradays passed | Cumulative product, grams | Product grams/ Faraday |
|---|---|---|---|
| 2.29 | 29.9 | | |
| 2.79 | 50.7 | 30.0 | 0.59 |
| Three days pre-induction period | | | |
| 4.79 | 101.5 | 581.0 | 10.8 |
| 7.79 | 197.2 | 1,585.0 | 13.2 |
| 10.79 | 299.9 | 2,812.0 | 11.9 |
| 14.79 | 403.3 | 4,164.0 | 13.1 |
| 18.79 | 499.9 | 5,694.0 | 15.8 |
| 23.29 | 603.2 | 7,299.0 | 15.6 |
| 38.6 83 days | 909.5 | 11,862 | |
| Pre-induction "break" | 51 | 30 | 0.59 |
| Post induction period | 857.5 | 11,832 | 13.8 |
| | | (1) | 23.4 |

[1] Relative rate.

During the long post-induction period for the passage of 857 Faradays, the rate of production of fluorinated products was about 23 times that obtained during the three day induction period. The electrolytic cell operation was extended at this high rate substantially beyond the induction period, for a period of time at least 25 times that of the induction period with no difficulty in cell operation.

The 4-n. butylbenzoyl chloride fluorination product was found to have an 81.6% fluoroacid fluoride content. The major component, perfluoro-(4-n-butyl cyclohexane) carbonyl fluoride, was found to be at least 30.6% of the total product. Several other acid fluorides, some not totally fluorinated, were found to be present, but were not more than 51.0% of the total product.

From the foregoing examples it appears that a certain threshold value must be passed to obtain high yields of fluorinated product generally in the order of at least fivefold and as high as about twenty-five fold that of the pre-induction rate. The fluorinated cyclic acid fluoride formed resisted decarbonylation to a remarkable degree with the result that yields of about 70 to 90 percent of mixed fluorinated products were obtained and, generally, 60 to 90 percent or more of the crude products were the desired poly- and perfluorinated-acid fluorides, for a net yield of about 42 to 81 percent of theory; accompanied by the production of only a minor amount of inert (decarbonylated) fluorocarbons.

In a manner similar to the electrolytic fluorinations described above, high yields of functional fluoro-organics can also be obtained from the ortho and meta isomers of alkyl aromatic acid halides as charge stocks, as well as from branched and straight chain alkyl substituted aromatic acid halides with alkyl substituents of from 2 to 10 carbon atoms; from acids per se, acid anhydrides, esters, amides and anilides. The ethyl and higher alkyl substituted benzoic acids have apparently not been perfluorinated heretofore. Accordingly, the $C_2F_5$, $C_3F_7$, $C_4F_9$ and related perfluorinated $C_2$ to $C_{10}$ substituted cyclohexane carbonyl fluorides and their derivatives are new compositions. These fluoro-acid fluorides as a group have been found to have unusual properties useful in the formation of materials imparting perfluoroorganic characteristics to the surface of a substrate. For example, the perfluoroalkyl cyclohexane carbonyl fluorides may be converted to derivatives which are polymerizable monomers, and such monomers may be converted to higher molecular polymers which are effective as oil and water repellents when deposited on fibrous materials, as will be more fully described below.

The perfluoro cyclohexane carbonyl fluorides are reactive compounds from which a variety of interesting and new derivatives have been prepared such as the acids, esters, amides etc. As further described below in detail, the perfluorocyclohexane carbonyl fluorides react readily with alcohols to form esters:

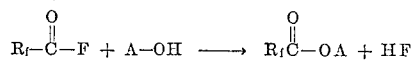

and with water to form carboxy acids as shown by the equation where A is hydrogen or an alkyl $C_1$ to $C_6$ group.

EXAMPLE V

A 250 ml., 3 necked flask equipped with a magnetic stirrer, condenser, gas inlet and adapter, was dried with a heat gun for 30 minutes, and purged with dry nitrogen. To the flask was added 159 gms. of crude perfluoro-(4-isopropylcyclohexane) carbonyl fluoride cell product. These drainings consisted of 70% active poly and perfluoro-acid fluorides and 30% inert fluorocarbons. The theoretical yield of perfluorinated acid would, therefore be 106 gms. Then 5.8 gms. (0.32 mole) of water were added and an immediate exotherm was observed. The mixture was stirred at room temperature overnight. Upon distillation, 32.1 g. of forecut and 72.3 g. (68% of theory) of principally the expected perfluorinated acid were collected. The forecut was assumed to be fluorocarbon on the basis of boiling point and infra-red spectra.

In a similar manner, a number of other perfluorocyclohexane carboxylic acids have been prepared as exemplary compounds from such acid fluorides.

The physical data characterizing technical grades of certain perfluorocyclohexane carboxylic acids, as produced, are as follows:

| Perfluorocyclohexane carboxylic acid | B.P. ° C. | At mm. hg. pressure | Percent yield | Refractive index | Neutralization equivalent | |
|---|---|---|---|---|---|---|
| | | | | | Observed | Calculated |
| 4-ethyl | 192–194 | 760 | 88 | $N_D^{23}$ 1.329 | 451 | 426 |
| 4-isopropyl | 72–82 | 0.25 | 68 | $N_D^{20}$ 1.3360 | 480 | 476 |
| 4-n-butyl | 100–105 | 2.5 | 78 | $N_D^{25}$ 1.3332 | 520–530 | 526 |

The fluoro-carboxylic acids, the carbonyl fluorides and the electrolytic cell product rich in perfluoro-acid fluoride have been reacted with ammonia to form amides.

EXAMPLE VI

Preparation of perfluoro (4-n. butylcyclohexane) carboxylic acid amide

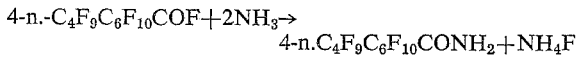

400 grams of crude acid fluoride cell drainings were charged into a 500 ml., 3-necked flask equipped with condenser, thermometer, and ammonia inlet. The flask was cooled to below 0° C. in an ice salt bath. An equal volume of diethyl ether was added to the flask. Ammonia was bubbled through the ethereal solution until no further exotherm was noted. The ether was flashed off from the filtrate and the residue distilled under aspirator pressure (approximately 20 mm.). The boiling point was 120–130° C. and the yield of yellow solids was 148 grams. The yellow solids were redistilled at a pressure of 0.2 mm. Hg and at a temperature of 83–87° C. The distillate was a viscous oil that crystallized upon standing to a light yellow waxy solid.

Similarly, the perfluoro-acid fluorides can be reacted with amines to form N-substituted perfluoro-acid amides, with alkanol amines to form N-hydroxy alkyl amides, and with amino-alkyl esters of polymerizable acids, as hereinafter described.

The fluoro-acid fluorides, as the principal products of the process, are readily linked to polymerizable moieties, (1) Directly by (a) the formation of esters with hydroxy-alkyl esters of polymerizable acids;
(b) the formation of esters of unsaturated alcohols such as crotonyl alcohol, allyl alcohol, cyclobutenol, or the like;
(c) the formation of amides by reaction with aminoalkyl esters of polymerizable acids, or (2) by the formation of esters of polymerizable acids wherein a fluoro-cyclohexane carbinol moiety is linked to a polymerizable acid or the like.

Illustrative of these structures are the compounds:

$C_9F_{19}$—$C_6F_{10}CO_2CH_2CH=CH_2$
$C_8F_{17}$—$C_6F_{10}CO_2CH_2CH_2O_2CC(CH_3)=CH_2$
$C_5F_{11}$—$C_6F_{10}CO_2CH_2CH=CH_2$
$C_3F_7$—$C_6F_{10}$—$CO_2CH_2CH_2O_2CC(CH_3)=CH_2$
$CF_2F_5$—$C_6F_{10}$—$CO_2CH_2CH_2O_2CCH=CH_2$
$C_7F_{15}$—$C_6F_{10}$—$CON(CH_3)CH_2CH_2O_2CCH=CH_2$
$C_3F_7$—$C_6F_{10}$—$CON(C_2H_5)CH_2CH_2O_2CC(CH_3)=CH_2$
$C_2F_5$—$C_6F_{10}$—$CH_2O_2CCH=CH_2$
$C_4F_9$—$C_6F_{10}$—$CH_2O_2CC(CH_3)=CH_2$

Monomeric compounds, as here described, are of particular value when further developed as polymers for fabric treating, producing oil and water repellent fabrics of outstanding merit.

Compounds of the ester type above are prepared from the perfluoro-acid fluoride and preferably from the crude cell product of electrolytic fluorination, consisting principally of polyfluoro- and perfluoro acid fluorides by reaction with hydroxyethyl or hydroxypropyl acrylate or methacrylate in methylene chloride solution.

Typical though not limiting example is the preparation of perfluoro-(4-ethylcyclohexane) carboxylic acid ester of hydroxy-ethyl acrylate.

EXAMPLE VII

To a stirred methylene chloride solution containing 29 g. (0.25 mole) of hydroxyethyl acrylate, 26.3 g. (0.26 mole) of triethyl amine and a small amount of hydroquinone inhibitor there were slowly added 107 g. of total cell product from perfluoro-(4-ethylcyclohexane) carbonyl fluoride synthesis. The reaction mixture was allowed to remain at room temperature for several hours after the addition was completed. Approximately 20 percent of the cell drainings were inert fluorocarbons which were insoluble in methylene chloride and were separated on discontinuation of the stirring. The remaining solution of the product was washed twice with 200 ml. of water, dried over magnesium sulfate, and the solvent evaporated, giving 82 g. (75 weight percent yield) of the desired ester:

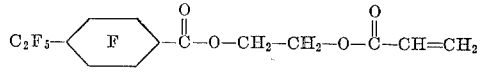

The product was further purified by distillation, the main cut distilling at 82–88° C. at 0.1 mm. Hg.

Essentially the same procedure and conditions are followed in preparing related homologs, where, for example, the perfluoro-ethyl substituent on the ring is replaced by another perfluoro-alkyl group having less than 11 carbon atoms. Perfluoroester acrylates of this type are generally obtainable in good yields, of the order of 70 to 90 percent by weight.

Similarly perfluoro-cyclohexane carboxamides of aminoethyl acrylate or methacrylate were prepared from perfluorocyclohexane carbonyl fluorides and aminoethyl acrylate or methacrylate.

EXAMPLE VIII

To 234 g. (2.1 moles) of N-methylethanolamine hydrochloride in 600 ml. of benzene containing hydroquinone as an inhibitor, 219 g. (2.1 moles) of methacrylyl chloride were added. The reactants were refluxed for 1½ hours and allowed to stand overnight. The mixture was cooled and filtered and the salt washed with ether. The yield of N-methyl-aminoethylmethacrylate hydrochloride was 332 g., or 88 percent of theory.

To a stirred hot trichloroethylene solution containing 44.5 g. of the above N-methyl-aminoethylmethacrylate hydrochloride, 50.2 g. of triethyl amine were added. The mixture was cooled and filtered after one hour, and the filtrate dried over anhydrous magnesium sulfate to provide $HN(CH_3)CH_2CH_2O_2CC(CH_3)=CH_2$. The filtrate was transferred to a reaction flask and 81.3 g. of perfluorocyclohexane carbonyl fluoride were added at such a rate as to maintain gentle reflux. After standing for several hours, the mixture was washed twice with water, dried over magnesium sulfate and, after removing the solvent, 76 g. of the desired amide (68 percent yield) were obtained. The monomer was further purified by distillation, the main fraction distilling at 100–110° C. at 0.3–0.4 mm. Hg.

Monomeric esters of the corresponding perfluoro alcohols may be prepared by an appropriate sequence of reactions. The crude electrolytic cell product consisting principally of perfluorinated cyclohexane carbonyl fluorides is esterified for example with absolute ethyl alcohol to form the ethyl ester as in Example I. Then the ester is reduced to the carbinol and reacted with acrylyl or methacrylyl chloride to prepare the monomer fluoroester.

and again water. After drying and evaporating the ether, 211.5 g., (93.7 percent yield) of the acrylate ester were obtained which were then distilled at 80–95° C. at 1.0 mm. Hg.

Using the same procedure, exemplary acrylates and methacrylates were prepared in good yield, having physical properties as follows:

| | Percent yield | Boiling point |
|---|---|---|
| $4-C_2F_5-C_6F_{10}-CH_2-O_2CCH=CH_2$ perfluoro-(4-ethylcyclohexane)methanol acrylate | 83 | 36–37° C. at 0.3 mm. Hg. |
| $4\text{-iso } C_3F_7-C_6F_{10}-CH_2-O_2CCH=CH_2$ perfluoro-(4-isopropylcyclohexane)methanol acrylate | 70 | 63–86° C. at 0.3 mm. Hg. |
| $4\text{-n.} C_4F_9-C_6F_{10}-CH_2O_2CCH=CH_2$ perfluoro-(4-n.butylcyclohexane)methanol acrylate | 67 | 80–95° C. at 1.0 mm. Hg. |
| $4\text{-n.} C_4F_9-C_6F_{10}-CH_2-O_2CC(CH_3)=CH_2$ perfluoro(4-n.butylcyclohexane) methanol methacrylate | 86 | 60–70° C. at .05 mm. Hg. |
| $4\text{-iso } C_3F_7-C_6F_{10}-CH_2-O_2CC(CH_3)=CH_2$ perfluoro-(4-isopropylcyclohexane)methanol methacrylate | 89 | 90–97° C. at 0.1 mm. Hg. |
| Perfluoro-(4-methyl cyclohexane)methanol methacrylate | 78 | 58–60° C. at 0.05 mm. Hg. |

EXAMPLE IX (A) Crude cell product (466 g.) obtained from the electrolytic fluorination of 4-n.butylbenzoyl chloride was added to 185 g. of absolute ethanol. After several hours at room temperature, the solution was washed with water, sodium bicarbonate solution, and again with water, followed by drying over magnesium sulfate. The yield of ester designated as ethyl perfluoro-(4-n.butylcyclohexane) carboxylate was 394 g. Ethyl esters of perfluoro ethyl, perfluoro propyl and higher perfluoro alkyl cyclohexane carboxylic acids are prepared in like manner.

(B) Preparation of perfluoro-(4-ethylcyclohexane) carbinol. Into a 3-liter 3-neck flask equipped with a stirrer, condenser, and dropping funnel and previously heated and purged with dry nitrogen, there were adedd 32.3 g. (0.85 mole) of lithium aluminum hydride, and 1000 ml. of diethyl ether and the reactants stirred for two hours at room temperature; 580 g. (1.07 moles) of ethyl perfluoro-(4-ethylcyclohexane) carboxylate dissolved in 500 ml. of diethyl ether were adedd. Addition took place over 90 minutes with ice-bath cooling of the reaction flask. Next 100 ml. of methyl alcohol mixed with 100 ml. of diethyl ether were added to the reaction flask at ice-acetone temperature (−5° C.) to react with the excess LiAlH₄.

The contents of the flask were poured into a 4-liter beaker containing ice and hydrochloric acid, stirred and then poured into a separatory funnel and separated into two fractions. The water layer was washed with ether which was combined with the ether layer. This layer was then washed with saturated bicarbonate solution and water. The ether solution was dried over magnesium sulfate filtered and stripped of ether by rotary flash evaporation. The yield of crude perfluoro-(4-ethylcyclohexane) carbinol was 432.5 g., or 79 percent by weight. The crude product was purified by distillation under reduced pressure, yielding 214.5 g. of a material consisting predominantly of perfluoro-(4-ethylcyclohexane) carbinol and deemed to be a technical grade of such carbinol.

Several perfluoro-(4-alkyl cyclohexane) carbinols were prepared similarly. The boiling points of the thus prepared technical grade samples of these new compounds are:

| | Boiling point/press. |
|---|---|
| Perfluoro(4-ethylcyclohexane) carbinol | 76–96° C./20 mm. Hg. |
| Perfluoro(4-isopropylcyclohexane)carbinol | 76–95° C./20 mm. Hg. |
| Perfluoro(4-butylcyclohexane)carbinol | 70–80° C./20 mm. Hg. |

(C) Preparation of the acrylate ester of perfluoro (4-n.butylcyclohexane)carbinol. To 214.5 (0.42 mole) of perfluoro (4-n.butylcyclohexane) carbinol and 45.5 of triethyl amine in 750 cc. of ether cooled in an ice bath, 40.8 g. (0.45 mole) of acrylyl chloride were added dropwise. The ice bath was removed and the reaction allowed to remain at room temperature for two hours, after which time water was added until two clear layers were obtained. The aqueous layer was extracted with ether and the ether solutions combined and washed with water, bicarbonate The fluoro-monomers of the types described above were further polymerized (a) per se, to form high molecular weight homopolymers, (b) with polymerizable unsaturated compounds, such as acrylates, methacrylates, vinyl ethers, crotonyl esters, allyl esters, etc., or unsaturated hydrocarbons, such as polybutadiene, to produce high molecular weight copolymers, or (c) to form segmented copolymers by polymerization of fluoro-monomer in the presence of a hydrocarbon polymer; with polymerization being promoted by free radical initiators. Polymerizations have been carried out in bulk, in solution, and in emulsion.

EXAMPLE X

An oil and water repellent fabric treating composition was prepared by mixing:

1 gram of the acrylate ester of perfluoro-(4-ethylcyclohexane) methanol, 6 ml. of surfactant in solution in 94 ml. distilled water, comprising:

2 parts sodium lauryl sulfate
2 parts nonionic surfactant, octylphenoxypolyethoxyethanol containing about 16 $C_2H_4O$ units; and
2 parts non-ionic surfactant, octylphenoxypolyethoxyethanol containing about 30 $C_2H_4O$ units per molecule;
1 ml. of acetone and
1 ml. of 5% solution of ammonium persulfate initiator.

A 16 x 150 mm. Pyrex test tube was charged with the above ingredients, purged with nitrogen and sealed. The tube was placed in a shaking machine and agitated 15 minutes at room temperature; then placed in a bath at 82° C. and held there with agitation for 12 hours to form the homopolymer.

EXAMPLE XI

Five grams of the acrylate ester of perfluoro (4-isopropylcyclohexane) methanol, 5 g. of 15 percent surfactant (composed of equal amounts of nonionic surfactants having about 16 and 40 $C_2H_4O$ units per molecule of the octylphenoxypolyethoxyethanol type), 2 g. of 2-(2-ethoxyethoxy) ethanol and 1 gram of 5 percent sodium acetate solution were placed in a 100 ml., 3-necked flask. The flask was stirred, heated to 45° C., and 7 g. of a 3.7 percent aqueous solution of persulfate were added. Essentially 100 percent conversion of monomer to homopolymer was effected within three hours.

The above-described treating compositions are applied to textile fabrics by any of the usual procedures commonly known in the art for imparting oil or water repellency. For example, the treating composition may be applied to the dry or pre-wetted fabric by padding, freed from excess liquid by squeezing through rollers, followed by drying at temperatures of 120 to 180° C.

In addition to the homopolymers prepared by the methods described in Examples X and XI above, copolymers were prepared in which the fluoro monomers were copolymerized with a commercial acrylate or methacrylate ester monomer containing up to 10 carbon atoms in the alcohol portion of the ester moiety.

EXAMPLE XII

A representative fluorine-containing segmented copolymer was prepared by agitating the fluoromonomer with a preformed polybutadiene emulsion in the presence of potassium persulfate at 50° C.

The polybutadiene emulsion was made by the following procedure:

An 8 ounce glass pressure bottle was charged with

| | Grams |
|---|---|
| Acetone by weight | 6.99 |
| Dodecylmercaptan by weight | 0.28 |
| Octylphenoxypolyethoxethanol having about 16 $C_2H_4O$ units per molecule | 1.04 |
| Octylphenoxypolyethoxethanol having about 40 $C_2H_4O$ units per molecule | 1.04 |
| Water (doubly distilled) | 27.16 |
| Butadiene | 14 |
| Potassium persulfate solution, 0.8 percent | 7 |

The bottle was purged with nitrogen, sealed, and placed in an end-over-end rotating reactor heated to 50° C. for 16.5 hours. At the end of this time 81.5 percent conversion of monomer to polymer was observed.

A segmented fluorine containing copolymer was then made employing the above polybutadiene emulsion by charging a 2° x 125 mm. screw capped test tube with the following:

5.8 grams polybutadiene emulsion (20 percent polymer), 1.16 grams of the acrylate ester of perfluoro(ethylcyclohexane) methanol, and 0.58 gram of 2 percent potassium persulfate solution. The tube was purged with nitrogen, sealed, and heated at 50° C. for 24 hours in an end-over-end rotating reactor. The conversion to a segmented or block copolymer was essentially complete. The emulsions were freed of traces of coagulum by filtration through cheesecloth before use, when necessary. The weight of solids present was determined by placing a weighed sample of emulsion in an aluminum dish and drying at 150–170° C. for ½ hour in a forced draft oven. On the basis of the total weight of solids obtained, the fluorocarbon content could be calculated for correlation with the oil and water repellency evaluation.

The procedure employed in evaluating the effectiveness of the aqueous emulsions for imparting oil repellency to fabric was designed to permit measurement of applied concentration from a knowledge of the concentration of the component in the emulsion. Cloth samples were uniform rectangles of cotton fabric having an 80 x 80 thread count. When such untreated cotton was wet with water and squeezed through rollers, it retained an amount of water which was consistently uniform per unit area, and this water retention, was treated as the wet weight pickup. When the untreated cotton was wet with an aqueous dispersion of a fluorocontaining modifier, and squeezed through rollers, the fabric retained the same amount of water as before, and the fabric retained an amount of modifier corresponding to that contained in the emulsion thus used to impregnate the fabric. The concentration of the modifier in the excess liquid squeezed from the fabric by the rollers was the same as in the initially employed impregnating emulsion. By this approach, the amount of impregnated modifier could be readily measured in each of a series of tests without the delays and expense involved in analyzing the impregnated samples for fluorine content.

After the fabric sample had been treated with the emulsion and freed from excess emulsion by squeezing through rollers, it was heated at 150–175° C. for about 3 minutes to remove all water and to provide a dry fabric sample impregnated with the modifier.

The repellency of treated fabrics was measured by Standard Test No. 22–52, published in the 1952 Technical Manual and Yearbook of the American Association of Textile Chemists and Colorists, vol. XXVIII, p. 136.

The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture.

The oil repellency rating numbers were chosen to correspond with the A.A.T.C.C. Standard Spray Ratings which are now in use for testing water repellent finishes.

| Oil repellency rating | Percent heptane | Percent mineral oil |
|---|---|---|
| 100(+) | 60 | 40 |
| 100 | 50 | 50 |
| 90 | 40 | 60 |
| 80 | 30 | 70 |
| 70 | 20 | 80 |
| 50 | 0 | 100 |
| 0 | 0 | |

Polymers of the type described in Example XII yielded emulsion latices which, when applied to cotton fabric, afforded water repellency and oil repellency as described in Table I in which table the fluoropolymer is identified in accordance with a list:

(A) poly - [perfluoro - 4 - n.butylcyclohexane]methanol acrylate
(B) poly - [perfluoro - 4 - ethylcyclohexane]methanol acrylate
(C) poly-2-hydroxy ethyl acrylate ester of [perfluoro-4-n.butylcyclohexane] carboxylic acid
(D) poly - 2 - hydroxy ethyl acrylate ester of [perfluoro-4-ethylcyclohexane] carboxylic acid
(E) poly-2-hydroxy ethyl acrylate ester of [perfluoro-4-isopropylcyclohexane] carboxylic acid

TABLE I

Oil and Water Resistance of Textiles Treated with Polymeric Derivatives of Perfluorocyclohexane Carboxylic Acids

| Fluoropolymer component | Concentration of fluoro-polymer component on cloth, percent | Repellency | |
|---|---|---|---|
| | | Oil | Water |
| A | 1.0 | 100 | 100 |
| B | 1.0 | 100 | 80 |
| C | 1.0 | 100 | 90 |
| C | 0.5 | 100 | 90 |
| D | 1.0 | 100 | |
| E | 1.0 | 100 | 100 |

While these examples demonstrate the efficacy of the fluoropolymers of the invention as fabric treating agents to impart oil and water repellency in general, the influence of molecular structure on effectiveness is shown to a remarkable degree with various perfluoro-cyclohexyl substituents. In a series of evaluations of polymers corresponding to the formula

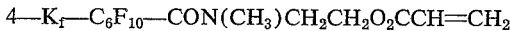

$$4-K_f-C_6F_{10}-CON(CH_3)CH_2CH_2O_2CCH=CH_2$$

in which there were differences in the $K_f$ component, the results showed that:

Oil repellency rating at 1 percent reagent
$K_f$ substituent: on fabric
Where $K_f$=F— 50
Where $K_f$=$CF_3$— 80
Where $K_f$=$C_2F_5$— 100
Where $K_f$=i. $C_3F_7$— 100
Where $K_f$=n. $C_4F_9$— 100+

A similar series of evaluations of oil repellency rating at 1% fluoro-component on the fabric showed that the $K_f$ component should consist of at least 2 carbon atoms to achieve acceptable oil repellency. The data for reagents derived from

$$4-K_f=C_6F_{10}COOCH_2CH_2OOCCH=CH_2$$

were as follows:

| $K_f$ component: | Oil repellency rating |
|---|---|
| Where $K_f=$F— | 50 |
| Where $K_f=$CF$_3$— | 80 |
| Where $K_f=$C$_2$F$_5$— | 100 |
| Where $K_f=$i. C$_3$F$_7$— | 100 |
| Where $K_f=$n. C$_4$F$_9$— | 100+ |

There is clearly a sharp improvement in effectiveness of an oil repellent when the $K_f$ substituent is perfluoroethyl, perfluoroisopropyl, perfluorobutyl, or a higher perfluoro-alkyl group to $C_{10}$.

The particular effectiveness of perfluoro-(4-n-butyl cyclohexane) methanol acrylate is shown when copolymerized as a segmented copolymer with polybutadiene. Cotton fabric treated with this polymer and cured by the standard procedure had a 100 rating for both oil repellency when the fabric contained 0.5% of fluorinated polymer. Even lower concentrations produce water and oil repellency to an effective degree.

It has previously been suggested to react a perfluorinated higher alcohol and unsaturated acid component such as acrylic acid or the like, to form polymerizable esters. The polymers formed by such esters are generally of a soft to rubbery consistency. On the other hand, hard resistant resinous products are obtained by polymerization of the compounds of the present invention comprising a fluorinated cyclohexane group attached to an unsaturated hydrocarbon moiety through a carbonyl containing linkage. Illustrative of the monomers in the preferred group are those formed by reacting a perfluorinated cyclohexane carbonyl compound with a hydroxyl alkyl or amino alkyl acrylate or methacrylate compound.

It is to be understood that the best performance of specific fluoro-polymers of the invention as fabric treating agents to impart oil and water repellency thereto may be obtained by using compositions in which the fluoropolymer is blended with hydrocarbon polymers, aminoplasts, quaternary salts, metal salts and similar addends. Such selected addends apparently act as synergists to extend the effect of fluoropolymer.

Since numerous variations are possible in the compounding of polymers and copolymers and various means and degrees of polymerization are effective in producing fiber treating agents, the examples here given are simply illustrative of a significant area of application for the perfluoro alkyl cyclohexane carbonyl fluoride derivatives of the invention.

Obviously, many modifications and variations of the invention as hereinbefore set forth may be made without departing from the spirit and scope thereof, and therefore only such limitations should be imposed as are indicated in the appended claims:

The invention claimed is:
1. Polymerizable monomers formed by reaction of a perfluorinated cyclohexane carbonyl compound with an ester derivative of an unsaturated aliphatic acid selected from the group consisting of acrylic acid and methacrylic acid which ester corresponds to one of the formula

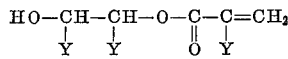

and

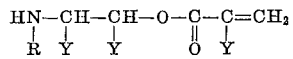

wherein Y is hydrogen or methyl and R is hydrogen or an alkyl group having from 1 to 4 carbon atoms.

2. Compounds of the formula

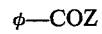

in which $\phi$ is a perfluorinated cyclohexane group having a perfluoro alkyl side chain of from 2 to 10 carbon atoms, Z is selected from the group consisting of F, Cl, Br, and OH.

3. The compounds of claim 2 in which $\phi$ is a perfluoro cyclohexane group having a $C_2$ substituent.

4. The compound of claim 2 in which $\phi$ is a perfluoro cyclohexane group having a $C_3$ substituent.

5. The compound of claim 2 in which $\phi$ is a perfluoro cyclohexane group having a $C_4$ substituent.

6. Monomeric esters of compounds of claim 2 in which the ester contains at least one polymerizable ethylenic group selected from the group consisting of acrylates and methacrylates.

References Cited

UNITED STATES PATENTS

| 2,593,737 | 4/1952 | Diesslin et al. | 260—514 |
| 2,717,871 | 9/1955 | Scholberg et al. | 260—544 |
| 2,803,615 | 8/1957 | Ahlbrecht et al. | 260—486X |
| 2,803,656 | 8/1957 | Ahlbrecht et al. | 260—486X |
| 3,207,730 | 9/1965 | Guenthner | 260—486X |
| 3,249,596 | 5/1966 | Pierce et al. | 260—486X |
| 3,283,012 | 11/1966 | Day | 260—617 |

LEWIS GOTTS, Primary Examiner

P. J. KILLOS, Assistant Examiner

U.S. Cl. X.R.

106—2R, 207R; 117—139.5A, 161UZ; 204—59R, 159.11R, 159.22R; 252—8.8R; 260—514R, 544C, 546R, 557R, 617R